July 4, 1961 S. VITTORELLI 2,990,870
PNEUMATIC TIRES HAVING CARCASS PLIES WITH MUTUALLY
DIFFERENT EXTENSIBILITY CHARACTERISTICS
Filed July 8, 1958 2 Sheets-Sheet 1

INVENTOR
Sergio Vittorelli
BY Stevens, Davis, Miller & Mosher
ATTORNEYS

United States Patent Office 2,990,870
Patented July 4, 1961

2,990,870
PNEUMATIC TIRES HAVING CARCASS PLIES WITH MUTUALLY DIFFERENT EXTENSIBILITY CHARACTERISTICS
Sergio Vittorelli, Milan, Italy, assignor to Pirelli S.p.A., Milan, Italy
Filed July 8, 1958, Ser. No. 747,268
3 Claims. (Cl. 152—356)

The present invention relates to the carcasses of pneumatic tires for vehicle wheels, and more precisely, it concerns a new improved construction which provides a better distribution of the stresses in the various carcass layers.

The carcass of conventional tires heretofore known is considered to be composed of a certain number of superposed plies in which the cords have generally the same extensibility in all layers.

When this conventional tire is not subjected to use or motion, the various plies undergo tensile stresses only, which are due to the inner inflation pressure of the tire. When, however, this conventional tire is in motion, the carcass plies, particularly in the sidewall areas, are subjected to stresses of various kinds and especially to flexion stresses which occur periodically at any turn of the wheel and which reach their maximum at the mid-line of the tire in the zone which comes in contact with the ground. According to the position of each ply in the carcass, the periodic stresses occurring in consequence of flexion are different, and their variations are more considerable the greater is the number of plies provided in the carcass.

More precisely, in the inflected part of the tire the outer plies are subjected to tensile stresses the value of which will be progressively decreasing with respect to the inner plies. This decrease may reach such a value as to cancel out the stress due to the inflation pressure, or even to exceed it, and, in the latter case, the innermost plies will be subjected to compressive stresses. If the pneumatic tire is provided with a layer in which the ply or plies are not subjected to any stresses, this layer may be referred to as a "neutral layer."

Also, small obstacles encountered by the tire during its use can create some localized flexures which cause the above-mentioned phenomenon.

The inconveniences due to this variation or alternation of the stresses are clearly evident. Under compressive stresses, the threads of the ply cords exhibit a tendency to detach themselves from the rubber compound in which they are embedded. In the case of tensile stresses, the threads of the ply cords may break after a period of time in consequence of the fatigue, or they may approach one another in such a way as to cut through the rubber compound in which they are embedded.

In accordance with one form of the present invention, it has been found that these inconveniences can be obviated by using a carcass composed of at least two groups of plies, each group being formed at least of a pair of plies in which the cords of one ply are symmetrically disposed with respect to the cords of the other ply, the plane of symmetry being the midcircumferential plane of the tire perpendicular to the rotational axis thereof. Each of the above groups is composed of plies having a given extensibility and the adjacent group (or groups) is composed of plies having a different extensibility. The arrangement should be such that the extensibility increases from the inner group toward the outer one.

It has been proposed heretofore, in certain tire carcasses, to employ one set of plies in which the cords were made of a material having a given extensibility and a second set of plies in which the cords were made of a material having a different extensibility, but the particular disposition of the plies, in all such cases, have involved non-symmetrical structures.

The pneumatic tire forming the object of the present invention has, on the other hand, a symmetrical structure which makes it well balanced. In a preferred embodiment of this invention, each group of carcass plies will include an even number of plies, one half of these plies having the cords disposed along one direction and the other half having the cords disposed along a crossed direction with respect to the former, such that these crossed directions are symmetrical with respect to the aforementioned plane of symmetry of the tire. Moreover, the tire of the present invention is capable of withstanding stresses considerably higher than those of the conventional tires.

In accordance with another embodiment of the present invention, it is also possible to obtain the results referred to above by using plies of different extensibility in the so-called "radial" carcasses, namely, in those carcasses wherein the plies are made of cords lying in planes passing through the rotational axis of the tire. In the case of this embodiment, it should be pointed out that the plies constituting each group may be provided in uneven numbers (if desired) without affecting the symmetry of the structure.

Where the terms "symmetrical" or "symmetry" are employed throughout this specification, they are intended to refer to the structural similarity between the two portions of the carcass divided by the mid-circumferential plane perpendicular to the axis of rotation of the tire. In light of this explanation, it should be evident that those structures described above with crossed plies are indeed symmetrical with respect to this plane of reference; also, with regard to the last-mentioned embodiment involving the "radial" carcass, this structure will likewise be symmetrical with respect to the reference plane.

In accordance with the present invention, the difference in the extensibility of the cords of the various groups of plies may be achieved in several different ways, for example:

(a) by using a different material for each single group of plies;

(b) by using the same materials for all of the plies, but wherein the stretch of the cords is varied in the different groups of plies;

(c) by using the same materials for all the plies, but wherein the twist and/or the composition of the cords is varied in the different groups of plies;

(d) by using two or more of the above arrangements jointly.

Other and further objects and advantageous features of the present invention will hereinafter more fully appear in connection with a detailed description of the drawings in which.

In these figures, like reference numerals indicate like parts.

Figure 1:
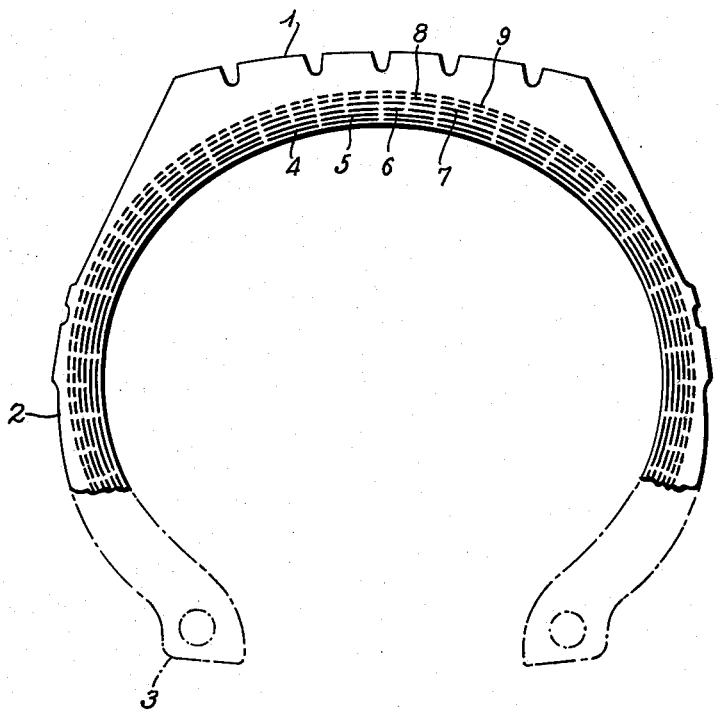
FIGURE 1 is a diagrammatic sectional view of a tire (profile) provided with carcass plies arranged according to one embodiment of the invention; the tire, in this view, is composed of three groups of plies, each formed of two plies wherein the cords of all plies are parallel to two directions only.

As may be seen in FIGURE 1, the pneumatic tire comprises a tread 1, side walls 2 and beads 3. The carcass of the tire is composed of three groups of plies, each of which is indicated by a different type of dash line. The innermost group is composed of two plies 4 and 5 having a high modulus of rigidity; the second group is composed of two plies 6 and 7 having a lower modulus of rigidity, and the outer group consists of two plies 8 and 9 having a modulus of rigidity lower than that of the second group.

Figure 2:
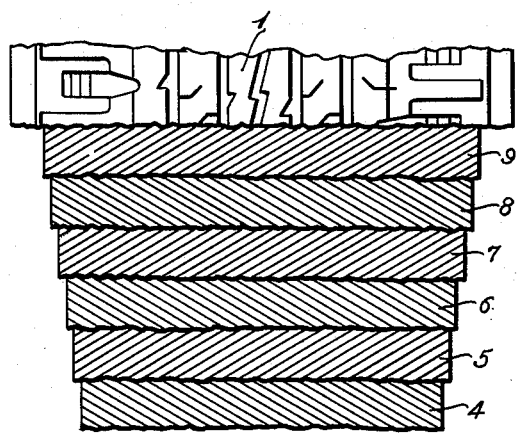
FIGURE 2 is a semi-diagrammatic plan view, with certain parts broken away and taken from the top of the tire shown in FIGURE 1.

FIGURE 2 represents, still diagrammatically but in a more detailed way, the disposition of the carcass plies of the tire shown in FIGURE 1. The plies 4, 6, and 8 each being part of a different group, have their cords parallel to a single direction which forms a given angle with the plane of symmetry of the tire; the alternate plies 5, 7, and 9 also have their cords parallel to another given direction which forms, with respect to the plane of symmetry, an angle symmetrical to the preceding one.

Figure 3:
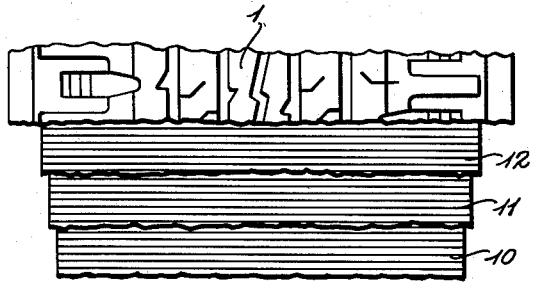
FIGURE 3 is a view similar to FIGURE 2 showing an additional embodiment of the present invention wherein three groups of plies are shown having radial cords.

According to a further form (or modification) of the present invention, as illustrated in FIGURE 3, the carcass may comprise three groups of plies each having radial cords, i.e., cords lying in planes passing through the rotation axis of a tire. In the showing of FIGURE 3, each of these groups is made of a single ply. The innermost ply 10 has the highest modulus of rigidity, the ply 11 a lower modulus, and the outer ply 12 a still lower modulus.

Each group obviously can comprise any desired number of plies, although in the case of the embodiment shown in FIGURE 2, this number must be even. It should be further noted in this regard that the embodiment shown in FIGURE 3 permits the employment of a lesser number of carcass plies in each group than would be necessary in the case of the plies having crossed and symmetrical cords as illustrated in the prior embodiment.

The differences existing between the conventional type of tire and the tire of the present invention shall be better understood in light of the following explanation, which, for the sake of simplicity, shall be considered in light of the illustration in FIGURES 1 and 2.

In the conventional tires in which the carcass plies all having the same extensibility (or modulus of rigidity), if flexion stresses do not occur, all of the plies are subjected to tensile stresses only as the result of the inner inflation pressure of the tire; in this instance, the values of this tensile stress are nearly equal for both the inner and outer plies. But when this conventional carcass is in use, the same is subject to flexion during the turning of the wheel, and as indicated above, the portion of the tire which comes in contact with the ground will undergo both compressive and tensile stresses; in other words, this portion of the tire may be considered as having an outer zone which is subjected to tensile stresses with values increasing toward the outside of the tire, and an inner zone subjected to compressive stresses in values increasing toward the inside of the tire; the space bteween these two zones can be considered as a "neutral" layer.

Thus, this conventional tire, when it is merely inflated and not under load or use, is stressed uniformly throughout; that is, the values of the tensile stresses on the outer plies are substantially equal to those of the inner plies. On the other hand, as soon as the carcass is subjected to flexure, the stresses become non-uniform.

Now, with regard to the present invention, if the tire is not under load with resulting flexure thereof, the result is the same as in the case of the conventional tire, that is, the carcass plies are subjected to tensile stresses only. However, in this instance, since the group of inner plies 4 and 5 have a higher modulus of rigidity, these inner plies withstand the greater part of the stresses due to the inflation pressure. When flexion does occur, the outer plies, and in particular, the plies 8 and 9, are subjected to considerable tensile stresses; the stresses resulting from this flexion will become progressively smaller for the inner plies without, however, reaching a compressive state for the plies 4 and 5, which as indicated above, withstand the greatest part of the stresses resulting from the inflation pressure. The increase of the tensile stresses under flexure for the group of plies 6 and 7 will not be significant.

Consequently, since the inner plies of the carcass are subjected to a considerably greater tensile stress than the outer plies when the carcass is merely inflated and not flexed, the structure may be considered as initially non-uniform; however, during flexion the structure in the region of the deflected portion of the tire tends to achieve a uniformity as far as stress conditions are concerned.

By means of the disposition of the various carcass plies in accordance with the present invention, the "neutral" axis closely approaches the location of the inner plies; in fact, in a structure comprising layers having a different extensibility, the neutral axis is in the proximity of the most rigid layers.

For the above reason, and in view of the further fact that the stresses in each layer are nearly proportional to the distances from the neutral axis in the carcass structure of the present invention, the compressive stresses are avoided in the innermost plies while the outer plies have a sufficient extensibility to withstand considerable tensile stresses without any damage. The present structure affords the additional advantage that a better distribution of the stresses is obtained during the most strenuous period of use of the tire.

In view of the disposition of the carcass plies according to the present invention, there is a further result that the difference between the maximum and minimum values of fatigue stresses (which includes all types of stresses) on each single cord of the innermost layers is reduced; on the other hand, in the conventional structures, since the innermost plies undergo stresses varying in value from compressive stresses to tensile stresses, the advantages of the present invention should be all the more apparent. In the outermost layers of plies in the tire of the present invention, the difference between the maximum and minimum values of the fatigue stresses can be greater than the corresponding values exisitng in the conventional tire structure; however, it should be pointed out that the average values of stress in these outermost layers are nevertheless lower in the case of the tire constructed in accordance with the present invention.

To further satisfy the needs of the present invention, and with regard to the cords of the outer plies, it is advisable to use materials which will not generate heat appreciably and which will have a high resistance to fatigue, for instance, the polyamides. With regard to the cords of the inner plies, it is preferable to use a material having a high tensile strength, as for instance, a suitable metallic material.

Therefore, in the tire illustrated in FIGURES 1 and 2, the plies 4 and 5 are preferably formed from metallic cords, the plies 6 and 7 from rayon cords, and the plies 8 and 9 of polyamide cords or threads.

Other materials may be employed in the various ply layers, but, at any event, the modulus of rigidity of the inner plies must be the highest and moduli of the plies of the other groups must gradually decrease toward the outside of the tire at a rate sufficient to permit the desired location of further groups of plies in the carcass of the tire.

Where the same material is to be used for all of the plies, the above result may be achieved by prestressing or prestretching the cords in the various groups of plies in a varying degree; also, the twist and/or composition of the cords may be varied in the different groups of plies to produce the same effect as stated above.

Furthermore, it is within the scope of this invention to combine the above two methods of achieving different moduli of rigidity in the various groups; for example, the innermost group may be composed of metallic material, and the remaining groups may be all composed of another material, such as rayon, where the cords of these remaining groups are variably twisted, stretched, or otherwise composed to effect a decreasing modulus of rigidity from the innermost group of plies to the outermost.

Other and further modifications apart from those shown or suggested herein may be made within the spirit and scope of this invention.

In the appended claims, the term "extensibility" is determined by the resulting modulus of rigidity of the cords in the ply or plies of each group. Thus, where the cords of a given group are considered to have a higher extensibility than the cords of the next adjacent group, then the cords in this given group would have a lower resulting modulus of rigidity than those of the next adjacent group.

What is claimed is:

1. A pneumatic tire comprising a carcass formed of at least two groups of cord plies, each group including at least two plies, characterized in that the cords of the plies are symmetrically arranged with respect to the mid-circumferential plane of the tire, and the cords of all of said plies are disposed along no more than two directions and that the extensibility of the plies increases from one group to the next from the inside toward the outside of the carcass.

2. A pneumatic tire as set forth in claim 1 wherein the cords of all plies are parallel to one of two directions, crossed and symmetrical with respect to said plane and, wherein, in each group, the number of plies having cords parallel to one of said directions is equal to that of the plies having cords parallel to the other direction.

3. A pneumatic tire comprising a carcass formed of at least two groups of cord plies, each group including at least one ply, characterized in that the cords of all of the plies are all contained in planes passing through the axis of rotation of the tire and that the extensibility of the cords increases from one group to the next from the inside toward the outside of the carcass.

References Cited in the file of this patent
UNITED STATES PATENTS

| 2,198,586 | McKone | Apr. 23, 1940 |

FOREIGN PATENTS

| 251,206 | Great Britain | Apr. 29, 1926 |
| 869,603 | Germany | June 11, 1953 |
| 726,810 | Great Britain | Mar. 23, 1955 |
| 758,914 | Great Britain | Oct. 10, 1956 |